United States Patent [19]

Hahs, Jr. et al.

[11] Patent Number: 4,806,440
[45] Date of Patent: Feb. 21, 1989

[54] LANTERN BATTERY SUBSTITUTE

[75] Inventors: Charles A. Hahs, Jr., Delray Beach; Victor V. Zaderej, Boca Raton, both of Fla.

[73] Assignee: CNI, Boca Raton, Fla.

[21] Appl. No.: 11,149

[22] Filed: Feb. 5, 1987

[51] Int. Cl.[4] .................. H01M 2/10; H01M 6/42; H01R 11/00
[52] U.S. Cl. ........................... 429/100; 429/1; 429/97; 429/99; 429/121; 429/159; 429/529; 439/733
[58] Field of Search .............. 429/121, 96–100, 429/1, 158, 159, 178; 339/28, 29 R, 29 B, 152, 250, 256 S, 258 F; 439/529, 731, 733, 751

[56] References Cited

U.S. PATENT DOCUMENTS

| | | |
|---|---|---|
| 1,487,428 | 3/1924 | Balderston . |
| 1,606,391 | 11/1926 | Schulte . |
| 1,624,795 | 4/1927 | Martus et al. ............ 429/99 |
| 1,627,264 | 5/1927 | Baird . |
| 2,134,402 | 10/1938 | Hines ..................... 439/529 |
| 2,383,337 | 8/1945 | Moxley . |
| 2,963,598 | 12/1960 | Kent ....................... 429/98 X |
| 3,178,317 | 4/1965 | Maddaloni ............... 429/99 |
| 3,219,485 | 11/1965 | Foecking et al. . |
| 4,114,681 | 9/1978 | Stiller ..................... 429/9 |
| 4,125,681 | 11/1978 | Sjogren .................. 429/9 |
| 4,125,683 | 11/1978 | Beckford et al. ........ 429/121 |
| 4,448,863 | 5/1984 | Terrell .................... 429/178 |
| 4,510,215 | 4/1985 | Adam ..................... 424/100 X |
| 4,607,207 | 8/1986 | Bruneau ................. 429/100 X |

FOREIGN PATENT DOCUMENTS 2015811 9/1979 United Kingdom ........ 429/159

OTHER PUBLICATIONS

Battery holder device shown in the photographs of Exhibit B manufactured by Dong IL Industrial Co., Seoul, Korea, date unknown.
Battery holder device shown in the Photographs of Exhibit A, Date and Manufacturer Uncertain.

Primary Examiner—Brian E. Hearn
Assistant Examiner—Stephen J. Kalafut
Attorney, Agent, or Firm—Jerry A. Miller

[57] ABSTRACT

A lantern battery substitute, comprises an upper assembly including an approximately square upper plate with rounded corners and four edges and having a resilient snap latch situated at approximately the center of the upper plate projecting downward normal to the plane of the upper plate. Four battery retaining legs project downward, one at approximately a center of each of the four edges. The legs are wide enough and situated at a suitable distance from one another so that a standard D-sized battery cell will not readily pass between any two legs situated on adjacent edges. A lower assembly includes a lower plate which is parallel to the upper plate and a base for supporting the lower plate. The base has depth adequate to cause the battery pack to have an overall height approximating that of a lantern size battery. A latch receiving aperture is situated on the lower plate, for receiving and engaging the snap latch for securing the upper and lower assemblies together. Leg engaging pegs receive and engage a portion of legs near the lower plate to resist flexing. Electrical bridges, connect four D size batteries in a series electrical circuit having positive and negative electrodes which are connected to terminals situated on the upper plate.

22 Claims, 2 Drawing Sheets

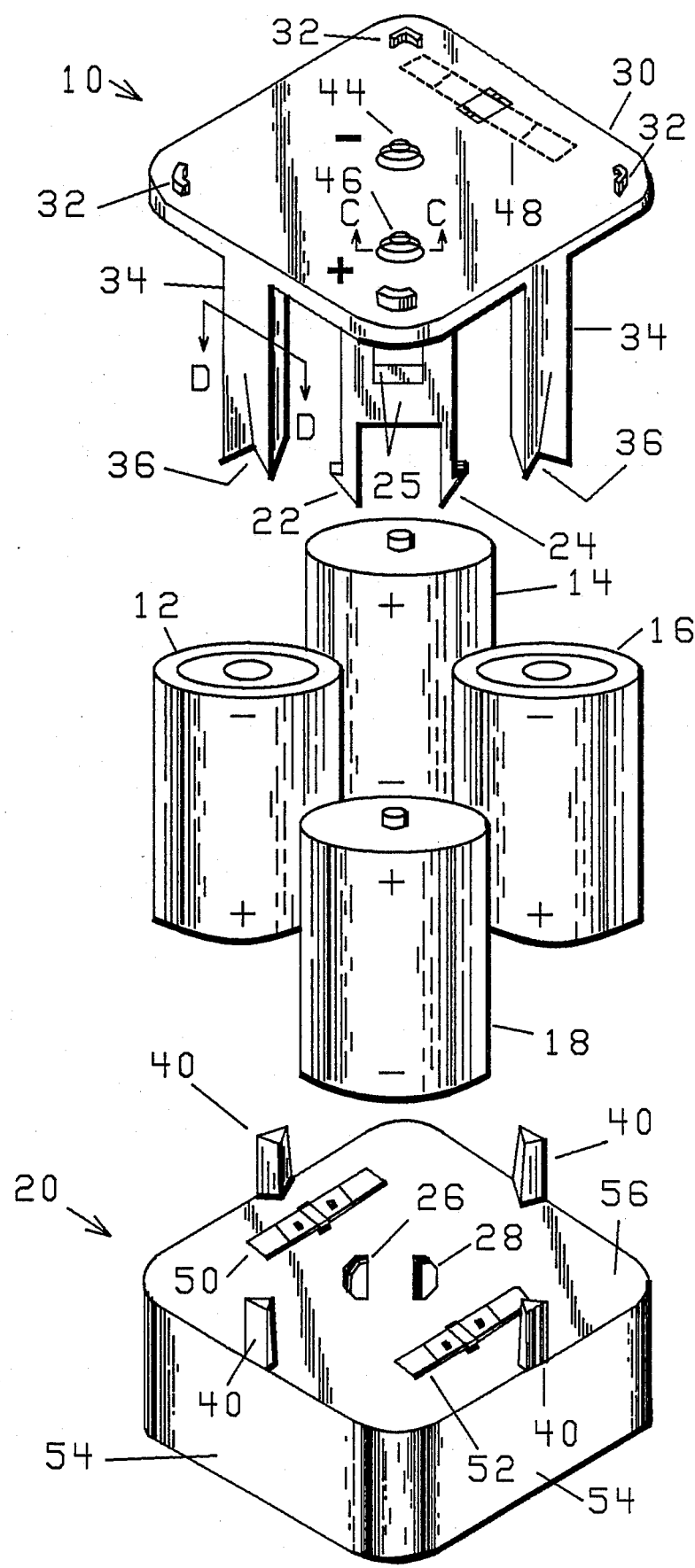

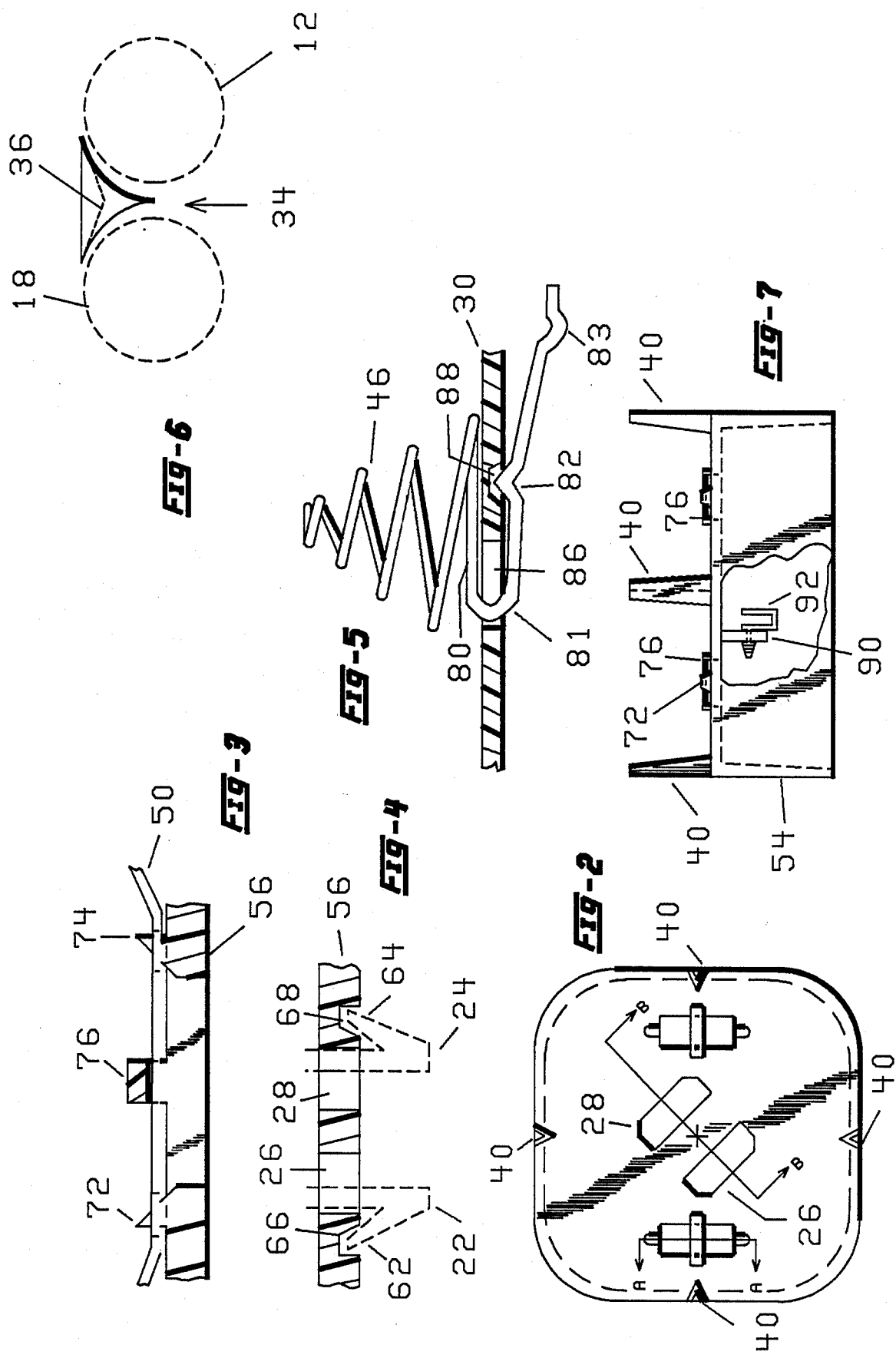

LANTERN BATTERY SUBSTITUTE

BACKGROUND OF THE INVENTION

1. Field of the Invention

This invention relates generally to the field of electric battery cell arrays and the like. More particularly, this invention relates to a battery holder which accommodates D-cell batteries and is suitable for substitution for conventional lantern batteries.

2. Background

Electrical battery technology has progressed rapidly over the past several years and with this progress has come an increased use of batteries as a source of power. In particular, alkaline battery technology has moved rapidly ahead with major manufacturers boasting that their products currently exhibit capacities much greater than the same product of only a year before. With this increase in battery life, cost has actually declined for popular size batteries. This is particularly true for the popular D-size battery commonly used in radios, flashlights and the like. The extremely large production volumes of such batteries provide clear benefits in the economy of scale for their manufacturers. This results in decreased prices which may be passed on to the consumer.

Unfortunately, less frequently used batteries such as the lantern size battery tend to remain relatively unchanged in design since their relatively low volumes may not justify the expense of redesign and retooling. But, with the advances of the D-cell technology, the present invention allows the lantern battery user to take advantage of these technology advances as well as the convenience of using a more readily available D-size battery.

In the past, D-cell batteries did not provide a practical solution for the lantern battery user due to a D-size battery's insufficient capacity. At this writing a typical heavy duty lantern battery produces 6.0 volts and delivers about 4.0 Amp-hours (AH). Alkaline lantern size batteries are available and deliver approximately 20 Amp-hours but are even less readily available than heavy duty lantern batteries and have a wholesale cost of approximately four times that of a heavy duty lantern battery.

The present invention allows the user to use an array of four D-size batteries which can produce about 14 Amp-hours for less than twice the cost of a simple heavy duty lantern battery (excluding the cost of the battery holder). This provides the user with about 70 percent of the capacity of an alkaline lantern battery at less than half the cost. Moreover, the conventional heavy duty lantern battery user can obtain a 250 percent increase in battery life for an increased cost of only about 67 percent. As battery technology continues to improve, the economic benefits will continue to multiply. Future advances in the field of Lithium cells as well as other technologies promise to enhance the financial attractiveness of the present invention even further.

Table 1 below shows the current large volume wholesale cost and energy data for typical batteries from which the above comparisons were derived:

TABLE 1

| BATTERY TYPE | CAPACITY | COST | COST/CAPACITY |
|---|---|---|---|
| Heavy Duty Lantern | 4.0 AH | $1.20 | $0.30/AH |
| Alkaline | 20.0 AH | $4.50 | $0.23/AH |
| Lantern D-Cells (4 in series) | 16.0 AH | $2.20 | $0.14/AH |

TABLE 1-continued

For purposes of the present description, the term "Lantern battery" is intended to cover batteries such as the Everready TM Hercules model as well as batteries which are similar or equivalent. Such cells are specified, for example in military specification MIL-8-4903017(EL), which is incorporated by reference. While the present invention is not limited to batteries which rigidly meet this military specification, the specification is useful in defining the general class of batteries which are the subject of this invention and is incorporated herein solely for that purpose. This conventional lantern battern design is shown in U.S. Pat. No. 1,627,264 to Baird. The manufacture of this type of battery today does not deviate very significantly from that disclosed in this 1927 patent.

The basic design of the Baird patent is modified somewhat in U.S. Pat. No. 4,125,681 to Sjogren to accommodate shorter cells by incorporating a spacer within the top of the enclosure. Also, there is provided a jack for charging rechargeable batteries.

In U.S. Pat. No. 1,487,427 to Balderston, a lantern-like battery holder structure is shown which is adapted to accept four cells which are held in place by a strap.

None of these references show a battery holder which allows use of conventional D-size batteries in a simple mechanical design which is easily assembled with few specialized parts and which is readily stackable as the present invention. Additionally, the present invention may in some instances allow military specification D-cell batteries to be used in place of military specification Lantern batteries.

SUMMARY OF THE INVENTION

Accordingly, it is an object of the present invention to provide an improved battery pack.

It is another object of the present invention to provide a lantern size battery pack which may be compactly stacked.

It is another object of the present invention to provide a lantern size battery pack which uses economical D size battery cells in a low cost, reusable snap together assembly.

It is another object of the present invention to provide a lantern size battery pack which uses a minimum number of specialized parts and which is quickly assembled.

It is another object of the present invention to provide a battery replacement for conventional lantern batteries which may be powered by inexpensive D cell batteries.

It is another object of the present invention to provide a battery terminal of simple design which is very easy to assemble.

It is a further object and advantage of the present invention to provide a lantern battery assembly which is easily assembled and requires very few parts thus reducing tooling, assembly and maintenance costs.

In one embodiment of the present invention an improved lantern battery pack, includes an upper assembly including an approximately square upper plate with rounded corners and four edges and having a resilient snap latch situated at approximately the center of the upper plate projecting downward normal to the plane of the upper plate. Four battery retaining legs project downward, one at approximately a center of each of the four edges. The legs are wide enough and situated at a suitable distance from one another so that a standard D-sized battery cell will not readily pass between any two legs situated on adjacent edges. A lower assembly includes a lower plate which is parallel to the upper plate and a base for supporting the lower plate. The base has depth adequate to meet standard lantern battery tolerances and cause the battery pack to have an overall height approximating that of a lantern size battery. A latch receiving aperture is situated on the lower plate, for receiving and engaging the snap latch for securing the upper and lower assemblies together. Leg engaging pegs receive and engage a portion of legs near the lower plate to resist flexing. Electrical bridges connect four D size batteries in a series electrical circuit having positive and negative electrodes which are connected to terminals situated on the upper plate.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 1 is an exploded isometric view of the major components of the present invention.

FIG. 2 is an overhead view of lower plate 56.

FIG. 3 is a partial cross-section taken along lines A—A of FIG. 2.

FIG. 4 is a partial cross-section taken along lines B—B of FIG. 2.

FIG. 5 is a partial cross-section taken along lines C—C of FIG. 1.

FIG. 6 is a cross-section taken along lines D—D of FIG. 1.

FIG. 7 is a partial cutaway side view of one embodiment of the lower assembly 20.

DETAILED DESCRIPTION OF THE INVENTION

Turning now to the drawings wherein like reference numerals designate identical or corresponding parts throughout the several views, and more particularly to FIG. 1 thereof, there is shown an exploded pictorial view of the lantern battery pack of the present invention. The lantern battery pack includes an upper or top assembly 10 which securely retains an array of four D size battery cells 12, 14, 16 and 18 in conjunction with a lower or bottom assembly 20. The upper and lower assemblies are appropriately dimensioned to accept D-cells which span the entire range of allowable tolerances. The battery cells are coupled together to form a series circuit of four 1.5 volt cells to provide the standard 6.0 volt output of a conventional lantern battery.

The upper assembly 10 is coupled to the lower assembly 20 when the batteries 12, 14, 16 and 18 are inserted by means of resilient snap latches 22 and 24. Snap latches 22 and 24 are preferably made of inexpensive ABS plastic but this is not to be limiting. They are joined together by a pair of braces 25 which serve to stiffen the spring lever arm of the snap latches. In addition, the braces prevent opening of the latch when the assembly is squeezed. The braces 25 may be designed closer to the latch ends to supply more stiffness and farther from the latch ends to reduce the stiffness. When assembled, the snap latches mate with apertures 26 and 28 to lock the upper assembly 10 and the lower assembly 20 together as will be more fully described later. The braces 25 are preferably in the form of two braces with one located on the near side of FIG. 1 and one on the far side of FIG. 1.

These two braces are essentially identical and occupy portions of parallel planes. The near brace connects the two snap latches together on the near side and the same two snap latches are connected together on the far side with the far brace so that the entire snap latch and brace assembly is symmetrical. In other embodiments, the bracing structure may be modified, for example, by using a single solid brace which braces both the near and far sides of the snap latches. In addition to providing stiffness to the snap latches, the braces also prevent the snap latches from disengaging if the assembled structure is squeezed. Without the braces, squeezing the batteries might allow the two snap latches to be squeezed together thus disengaging them.

The upper assembly 10 includes a substantially square upper plate 30 having rounded corners and four edges. In order to meet the standard size requirements of a lantern battery, the corners of the plate are rounded to an extent that allows the entire battery holder to fit within a tube having approximately 41.2 mm inner radius. When the batteries are installed, they do not protrude beyond the edges of the plate in the preferred embodiment. The upper plate 30 includes a plurality of raised members 32 near each corner. These raised members 32 serve as stacking guides, as will become clear later, to permit stacking of the battery pack to reduce the storage volume required for storing several of the battery packs.

In the preferred embodiment, all plastic parts of the upper assembly are molded together to form a single integral part 10. Similarly, all plastic parts of the lower assembly are molded together as a single integral part 20. All parts are preferably made of plastic except the terminals and the bridges so that the entire assembly has only seven parts total and only four unique parts—the upper part 10, the lower part 20, the three bridges and the two terminals (excluding battery cells).

Adjacent approximately the center of each edge of the upper plate 30, a leg 34 protrudes downward at an angle approximately normal to the plane of the upper plate. Each of the four legs 34 has an inner surface which approximately conforms to the radius of the battery cells when assembled. The lower ends of the legs include an approximately V-shaped groove 36 in the outer surface of the legs extending lengthwise along a lower portion of the legs and tapering off near the upper end of the leg so that there is maximum strength at the connection of the leg 34 and the upper plate 30. The legs are wide enough at their outer surface to prevent a D-size battery from passing between adjacent legs.

The lower assembly 20 includes a plurality of pegs 40 situated near the center of each of the sides. These pegs 40 have an approximately triangular cross section which mates with the V-shaped groove in each of the legs 34. The pegs and the groove are provided with a slight draft so that the upper ends of the pegs are of smaller cross sectional area than the lower ends and the lower ends of the grooves have a wider "V" than the upper end of the groove. This allows for easy alignment of the mating parts to facilitate assembly. Once assembled, the pegs 40 restrain the legs 34 at their lower ends to provide secure captivation for the batteries. Preferably the upper assembly as described so far is injection molded of ABS or similar plastic. Similarly, the lower assembly is made of injection molded ABS or similar plastic, but the preferred material selection is not to be limiting. Thus, the mass of the battery cells provide the bulk of the mass of the entire assembly and it is desirable to provide the aforementioned securing of the legs at both top and bottom to help minimize the possibility of damage if the battery pack is dropped.

The upper plate is fitted with a pair of spring contacts 44 and 46 for access to the series battery array. Spring contact 44 serves as the negative terminal and spring contact 46 serves as the positive contact of the battery pack. Of course, the present invention is not limited to the use of spring contacts as other types of battery contacts may be desirable in some situations. The spring contact 44 passes through the surface of upper plate 30 to contact battery cell 12 at it's negative terminal. The positive terminal of battery 12 is coupled to the negative terminal of battery cell 14 by a spring-like electrical bridge 50. The positive terminal of battery cell 14 is coupled to the negative terminal of battery cell 16 by an electrical bridge 48. The positive terminal of 16 is connected to the negative terminal of 18 by a bridge 52. The spring contact 46 passes through the surface of upper plate 30 and contacts the positive terminal of 18. Spring contacts 44 and 46 are commercially available for example from O'Hare Spring Co., Chicago, Ill. as part no. 9217. These springs and their equivalents are readily available commercially.

Since the length of a D-size battery is substantially shorter than that of a standard lantern size battery, the lower assembly is provided with a base 54 made up of a wall extending approximately normal to a lower plate 56 to form an inverted cup-like structure. This inverted cup-like structure has the added benefit of providing a simple mating with stacking guides 32 of another battery pack so that a number of such battery packs may be stacked one on top of the other. This allows the battery packs to be stored in a more compact space than conventional lantern batteries thus facilitating storage as well as packaging and shipping.

Turning now to FIG. 2, a view of plate 56 is shown. In this view, the structure of the electrical bridge assembly is shown from above (without the brides installed) as well as the pegs 40 and the apertures 26 and 28. This view is provided primarily as reference for the sectional views to follow.

Turning now to FIG. 3, an exemplary electrical bridge 50 according to the present invention is shown in section along section lines A—A of FIG. 2 in more detail to illustrate the mounting mechanism. Electrical bridge 50 is preferably a stainless steel spring approximately 46 mm long with a flat central portion about 23.5 mm long. The ends of the rectangular spring are bent upwards at about a 30 degree angle to form the battery contacting portion. The bridge 50 includes two apertures adjacent the center-most side of the two bends. These apertures mate with a pair of inwardly sloping ramp-like members 72 and 74. The inwardly sloping ramp surfaces allow the bridge to slide easily into place during assembly. The upper surface of the bridge 50 is restrained by a restraining finger 76. The bridge assembly is readily assembled in a matter of a few seconds thus significantly enhancing the production economy.

The allowable variation in length of a D-cell battery is relative large. The spring action of electrical bridges 48, 50 and 52 is used to correct for these wide variations as well as to provide electrical contact and preloading of the assembly.

Bridge 50, in addition to providing an exceedingly simple and inexpensive assembly, also has some other unique properties. When the batteries are in place and the top assembly 10 is mated with the bottom assembly 20, the spring exhibits a nonlinear characteristic. As the spring is flexed, the central portion tends to bow upward until the restraining finger 76 is contacted. When this happens, the spring loading increases and the spring appears stiffer than normal. Thus, when assembled, the present battery holder is held tightly together under spring tension.

Turning now to FIG. 4, which is a sectional view along lines B—B of FIG. 2, it can be seen that the snap latches 22 and 24 snap into apertures 26 and 28 within the cup-like bottom assembly 20. The assembly may be readily disassembled to install new batteries by reaching inside the cup-like bottom assembly from below and squeezing 22 and 24 together. In the preferred embodiment, the snap latches 22 and 24 each include a wedge-like retainer member 62 and 64 which mates with indentations 66 and 68 to more securely lock the upper and lower assemblies together. In alternative embodiments, the indentations may be replaced with apertures without departing from the invention. The angled walls of the indentations allow the retainer members to readily slide out of engagement when the snap latches are squeezed together. The spring force from the bridges 48, 50 and 52 keep the assembly tightly engaged otherwise.

During assembly, the bridges load the assembly to provide a solid feeling snap action when the snap latches 22 and 24 are snapped into engagement. Snap latches 22 and 24 snap through apertures 26 and 28 respectively to engage the bottom of plate 56. They may be released from inside the cup-like lower assembly 20. Due to the symmetry, the top assembly can only mate with the bottom assembly in one of two possible ways, either of which provides proper battery connection and polarity when the batteries are properly loaded. The single bridge 48 in the upper plate 30 also provides keying for assembly.

Turning now to FIG. 5, the assembly for mounting the spring contacts 44 and 46 is shown in partial section along lines C—C of FIG. 1. Spring contact 46 is seen to include a straight portion 80 passing approximately through the center of the lower spring loop. This straight portion 80 then bends at an approximate 180 degree angle and forms a sharp bend 82. This 180 degree angle portion fits in a slot 86 in plate 30. Sharp bend 82 mates with an indentation 88 to secure the spring in place. The end of the spring contact 46 extends outward from the sharp bend to form contacts for contacting the D-size cell. This type of contact may be used to make contact with either the negative or the positive contact of a battery cell when desired. The positive contact spring 44 is similarly mounted to plate 30 such that the area of spring contact 44 between the 180 degree angle portion and the sharp bend is situated approximately along the center line of the battery so that this portion of the spring serves as the contact for the positive D-size cell. The spring contact 46 also includes a second downward bend 83 which is used to facilitate contact with the negative end of one of the D-cells.

Turning now to FIG. 6, a section of leg 34 is shown along section line D—D of FIG. 1 to illustrate the true shape of the legs. Battery cells 12 and 18 are shown in broken lines to illustrate the relationship between the legs and the batteries. It should be noted, however, that batteries 12 and 18 are normally touching or almost touching to assure meeting the size requirements of the overall package. They are shown relatively widely separated from each other and leg 34 for clarity.

The inner surfaces of the legs are curved to conform to the shape of the battery cells and the outer edges of the legs extend slightly beyond the point needed to captivate the battery cell between two adjacent legs. In this manner, the battery cells themselves form the outer surface of the assembled package assuring that the standard size requirements for a lantern battery are met.

Turning now to FIG. 7, the lower assembly 20 is seen. This view shows the cup like nature of the lower assembly 20 and additionally provides further detail of the bridge assembly. FIG. 7 also shows a feature of certain embodiments of the present invention in which alternative battery terminals may be conveniently stored. In some instances it is desirable to provide for use of screw type battery terminals for lantern batteries. These are commonly used, for example, by model airplane fliers to start their airplane engines. However, these types of batteries are often difficult to find in stores. The present invention, by virtue of having a lower assembly 20 which has a hollow area inside, can accommodate storage of such alternative terminals as may be required.

FIG. 7 includes a terminal holder 90 which is a projection from the inner surface of plate 56 which includes a slot. A screw terminal 92 may be attached to the slot by simply sliding the open terminal into the slot and tightening the terminal in place. Those skilled in the art will recognize that other methods can be used to captivate various alternative terminals inside the lower assembly. Screw terminal 92 may be of such design as to have a bottom portion similar to the previously described spring contacts. Alternatively, the screw terminal 92 may be of conventional design for lantern battery screw terminals. Such conventional designs often include a readily bendable lower portion which may be inserted within a slot on plate 30 and secured in place by bending to conform to the inside of the plate 30. It is the hollow cup-like lower assembly 20 which allows for this convenient storage of alternative terminals.

THUS, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. An improved lantern battery pack, comprising in combination:
    an upper assembly including an approximately square upper plate with rounded corners and four edges and having a resilient snap latch means situated at approximately the center of said upper plate projecting downward normal to the plane of said upper plate;
    four battery retaining legs projecting downward normal to said plane of said upper plate, one at approximately a center of each of said four edges, said legs being wide enough and situated at a suitable distance from one another so that a standard D-sized battery cell will not readily pass between any two legs situated on adjacent edges;
    a lower assembly including a lower plate which is parallel to said upper plate when coupled to said upper assembly, and also including a base for supporting said lower plate, said base having depth adequate to cause the battery pack to have an overall height approximating that of a lantern size battery;
    latch receiving means, situated on said lower plate, for receiving and engaging said latch means for securing said upper and lower assemblies together;
    leg engaging means for releasably receiving and engaging a portion of said leg near said lower plate to resist outward movement of said legs;
    bridging means, situated at said upper and lower plates, for connecting four D size batteries in a series electrical circuit having positive and negative electrodes; and
    terminal means, situated on said upper plate, for providing access to said positive and negative electrodes at said upper plate.

2. The apparatus of claim 1, wherein said terminal means includes a first spring terminal coupled to said positive electrode and a second spring terminal coupled to said negative electrode.

3. The apparatus of claim 1, wherein said base includes a wall running along the periphery of said lower plate and extending downward therefrom to produce an inverted cup-like structure.

4. The apparatus of claim 1, wherein said upper plate includes a stacking guide means on an upper surface thereof, said stacking guide means for engaging said base to permit stacking of two such battery packs in a space less than two times the space of one such battery pack to effect compact storage thereof.

5. The apparatus of claim 3, wherein said upper plate includes a stacking guide means on an upper surface thereof, said stacking guide means for engaging said wall from the inside to permit stacking of two such battery packs in a space less than two times the space of one such battery pack to effect compact storage thereof.

6. The apparatus of claim 1, wherein said legs include inner surfaces which substantially conform to the curved surface of a portion of D-size battery cells.

7. The apparatus of claim 1, wherein said legs include approximately V-shaped grooves at a lower portion thereof, and wherein said leg engaging means includes a plurality of pegs having approximately triangular cross-section for engaging said V-shaped grooves.

8. The apparatus of claim 1, wherein said bridging means includes a thin rectangular metal spring with two ends and having two bends symmetrically placed in said rectangle for biasing said two ends of said spring away from one of said upper and lower plates; and
    means for securing said spring to said one of said upper and lower plates.

9. The apparatus of claim 8, wherein said bridging means further includes:
    an aperture in said one plate;
    a finger covering a portion of said aperture;

a pair of protuberancies adjacent said apertures; and wherein said spring includes a pair of holes mating with said protuberancies with the center of said spring approximately situated between said finger and said aperture.

10. The apparatus of claim 1, further including carrying means for carrying an alternative set of battery terminals which may be physically substituted for the terminal means to provide a different terminal configuration.

11. The apparatus of claim 1, wherein said base includes a wall running along the periphery of said lower plate and extending downward therefrom to produce an inverted cup-like structure and further including carrying means situated within said cup-like structure for carrying an alternative set of battery terminals.

12. The apparatus of claim 11, wherein said terminal means includes a spring terminal and wherein said alternative set of battery terminals includes a screw terminal.

13. The apparatus of claim 1, wherein said upper assembly, said battery retaining legs and said snap latch means are all molded together as a single integral part.

14. The apparatus of claim 1, wherein said lower assembly, said leg engaging means and said latch receiving means are all molded together as a single integral part.

15. A lantern battery replacement, comprising:
an upper battery holder surface having a positive and a negative spring contact;
means, coupled to and situated below said upper surface for holding four D-size battery cells so that said D-size battery cells extend radially about a center line so that an outer surface of each of said cells is approximately 41.2 mm from said center line, the outer surface of said cells forming an outer boundary of said lantern battery replacement so that the lantern battery replacement fits within a cylinder of 41.2 mm radius, said means restraining said battery cells from radial movement;
a lower battery holder surface situated below said battery cell holding means;
assembly means for releasably coupling said upper and lower battery holder surfaces together and thereby captivating said battery cells in between, and for allowing disassembly of said upper and lower battery holder surfaces for replacement of said battery cells; and
a spacer coupled to said lower battery holder surface for extending the length of said lantern battery replacement to the length of a standard lantern battery.

16. The apparatus of claim 11, wherein said spacer includes a wall extending downward from the periphery of said lower surface to form a cup-like structure, and wherein said assembly means includes a snap fastener which extends through said lower surface and is releasable by access to the snap fastener provided within said cup-like structure.

17. The apparatus of claim 11, further including carrying means for carrying an alternative set of battery terminals which may be physically substituted for the terminal means to provide a different terminal configuration.

18. The apparatus of claim 12, further comprising stacking guide means for facilitating stacking of two of said lantern battery replacements in a space less than twice that required for a single lantern battery replacement.

19. A battery holder for substitution of four cylindrical D-cell batteries having battery cell terminals on the ends of said cylinders in place of a lantern battery, the housing comprising in combination:
an upper housing member;
a positive and a negative of battery terminal attached to said upper assembly;
a lower housing member;
latching means for releasably attaching said upper and lower housing members together providing space for said four D-cell batteries arranged in a side by side close packed configuration between said upper and lower housing members with each battery having two adjacent batteries;
said upper housing member and said lower housing member inhibiting vertical movement of said batteries when attached together by said latching means;
four retaining members, situated between said upper and lower housing members, for preventing said batteries from exiting said holder in a horizontal direction when said upper and lower housing members are attached together by said latching means, each of said retaining members situated between two adjacent batteries and each adjacent pair of retaining members defining an aperture less than the diameter of the D-cell batteries so that the batteries are prevented from exiting the battery holder in a horizontal direction; and
electrical connecting means for connecting said four D-cell batteries in series and for connecting said series connected batteries to said positive and said negative battery terminals.

20. An electrical bridge for making a connection between a pair of battery terminals, comprising in combination:
an elongated strip of metal having spring characteristics, said strip having ends forming battery contacts and having two bends in said strip so that said ends are bent upward at an angle, said elongated strip further including a pair of apertures adjacent said bends on the central side of said bends;
a supporting surface situated below said elongated strip having means defining a hole under a central area of said strip, said hole extending outward from the central area along the length of said strip to a point short of said bends so that the length of said hole is less than the distance between said bends;
said hole being wide enough to pass the width of said strip;
a restraining finger extending over said strip near said central portion of said strip to cover an area of the strip over a portion of said aperture; and
a pair of protuberancies extending upward through said apertures in said strip from said supporting surface below said strip to prevent movement of said strip; whereby
said strip is installed by threading said strip through a space defined by said hole and said restraining finger and is fixed in place by said protuberancies.

21. The apparatus of claim 20, wherein said angle is approximately 30 degrees.

22. The apparatus of claim 21 wherein said strip is made of stainless steel.

* * * * *